(12) United States Patent
Miyamoto

(10) Patent No.: US 6,475,114 B2
(45) Date of Patent: Nov. 5, 2002

(54) GEAR-MESH TYPE AUTOMATIC TRANSMISSION SYSTEM

(75) Inventor: Shoichi Miyamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 5 days.

(21) Appl. No.: 09/765,439

(22) Filed: Jan. 22, 2001

(65) Prior Publication Data
US 2002/0006849 A1 Jan. 17, 2002

(30) Foreign Application Priority Data

Jul. 12, 2000 (JP) ........................................ 2000-211450

(51) Int. Cl.$^7$ .............................................. B60K 41/02
(52) U.S. Cl. ........................ 477/179; 477/87; 477/175; 477/86
(58) Field of Search ................................ 477/174, 175, 477/179, 180, 86, 87, 83, 84, 181

(56) References Cited

U.S. PATENT DOCUMENTS

| 5,427,215 A | * | 6/1995 | Jarvis ........................ 192/3.63 |
| 5,655,996 A | * | 8/1997 | Ohtsuka ...................... 477/166 |
| 5,722,912 A | * | 3/1998 | Narita ........................ 192/3.31 |
| 5,743,829 A | * | 4/1998 | Tanizawa et al. ............ 477/174 |
| 5,754,969 A | * | 5/1998 | Ando et al. ................. 192/103 F |
| 5,890,994 A | * | 4/1999 | Sawamura et al. .......... 477/176 |
| 5,921,885 A | * | 7/1999 | Tabata et al. ............... 477/107 |
| 5,964,675 A | * | 10/1999 | Shimada et al. ............ 475/123 |
| 6,036,619 A | * | 3/2000 | Tashiro et al. .............. 477/154 |
| 6,139,471 A | * | 10/2000 | Tsutsui et al. .............. 477/155 |
| 6,183,389 B1 | * | 2/2001 | Tabata ........................ 477/174 |
| 6,227,998 B1 | * | 5/2001 | Iwao et al. .................. 477/174 |
| 6,290,626 B1 | * | 9/2001 | Noda et al. ................. 192/3.28 |
| 6,346,063 B1 | * | 2/2002 | Kondo et al. ............... 477/143 |

FOREIGN PATENT DOCUMENTS

| JP | 60-35633 | 2/1985 | |
| JP | 63-270252 | 11/1998 | |
| JP | 11-241789 | * 3/2001 | .................. 477/179 |

* cited by examiner

Primary Examiner—Christopher P. Schwartz
Assistant Examiner—Devon Kramer
(74) Attorney, Agent, or Firm—Sughrue Mion, PLLC

(57) ABSTRACT

A gear-mesh type automatic transmission system capable of controlling clutch coupling speed so as to mitigate shock likely to occur upon changeover of speed stage regardless of not only time-dependent deterioration of an electromagnetic clutch but also dispersion among individual clutches. The gear-mesh type automatic transmission system includes an electromagnetic clutch (2) for effectuating transmission and interruption of output power from an output shaft (21) of an engine (1) to an input shaft (22) of a gear-mesh type transmission (3), a shift/select actuator (5) for shifting a speed change gear to a shift/select position in the gear-mesh type transmission (3), a shift/select position sensor (6) for detecting a shift/select position of the speed change gear, and a control unit (4) for driving the shift/select actuator (5) in accordance with a shift lever position selected by a driver, to thereby change over automatically the gear-mesh type transmission (3) to a target speed stage. The control unit (4) is designed to couple the electromagnetic clutch (2) while carrying out a feedback control on the basis of a rate of change of rotation speed of the engine (1) in succession to the speed stage changeover.

7 Claims, 4 Drawing Sheets

GEAR-MESH TYPE AUTOMATIC TRANSMISSION SYSTEM

BACKGROUND OF THE INVENTION

1. Field of the Invention

The present invention generally relates to a gear-mesh type automatic transmission system capable of controlling clutch on/off operation, i.e., operation for changing over the clutch between a meshing state (on-state) and a released state (off-state). More particularly, the present invention is concerned with an improvement of the gear-mesh type automatic transmission system such that shock which may take place upon coupling of the clutch in succession to changeover of speed stage in the gear-mesh type automatic transmission system can be suppressed or mitigated regardless of time-dependent deterioration (i.e., deterioration as a function of time lapse) of the clutch.

2. Description of Related Art

Heretofore, there have been proposed and developed for practical applications a variety of gear-mesh type automatic transmissions employing gear-mesh type transmissions. By way of example, in the control apparatus for the gear-mesh type automatic transmission system disclosed in Japanese Patent Application Laid-Open Publication No. 270252/1988 (JP-A-63-270252), the output torque or power of an engine such as an internal combustion engine is inputted to a gear-mesh type automatic transmission through coupling operation (on-operation) of an electromagnetic clutch.

Further, in the case of the control apparatus described in the publication cited above, combination of operations of a pair of hydraulic/electromagnetic valves is adopted. More specifically, selection of a desired or target speed stage is realized by driving or actuating correspond-ingly a selection-dedicated three position hydraulic cylinder while changeover to the selected speed stage is realized by actuating a three position hydraulic cylinder dedicated for the gear shift operation.

Further, as a conventional clutch control unit known heretofore, there may be mentioned one disclosed, for example, in Japanese Patent Application Laid-Open Publication No. 35633/1985 (JP-A-60-35633). In this known clutch control apparatus, an electromagnetic clutch is so controlled that coupling thereof is carried out at a constant speed or rate. In that case, the clutch on/off performance of the apparatus will gradually change as a function of time lapse due to deterioration (abrasion) which the clutch undergoes during operation thereof.

Consequently, for a same clutch exciting current, there arises difference in the clutch coupling operation performance between a new electromagnetic clutch and a used one.

In particular, in the case where the clutch is coupled through a constant-speed control (open-loop control), there is a tendency that shock is more likely to take place upon coupling of the clutch in succession to speed stage changeover as the deterioration (abrasion) of the clutch gets aggravated even if occurrence of such shock can be controlled to be suppressed for the new clutch.

Furthermore, the clutch coupling force may differ from one to another electromagnetic clutch. Thus, for performing the open loop control mentioned above, it is necessary to determine in advance the clutch coupling speed in consideration of the intrinsic performance of the clutch to be employed so that the shock occurring upon clutch coupling operation succeeding to the speed stage changeover operation can be suppressed or mitigated at the least.

As is apparent from the foregoing, the conventional gear-mesh type automatic transmission system suffers a problem that shock may occur upon coupling of the clutch in succession to the speed changeover operation of the transmission due to the time-dependent deterioration such as abrasion of the clutch.

Further, for effectuating the open loop control, the clutch coupling speed has to be determined in advance in consideration of dispersion of the coupling force among the individual electromagnetic clutches so that occurrence of the shock upon clutch coupling operation succeeding to the speed stage changeover of the transmission can be suppressed, giving rise to another problem.

SUMMARY OF THE INVENTION

In the light of the state of the art described above, it is an object of the present invention to provide a gear-mesh type automatic transmission system capable of suppressing or mitigating shock which is likely to occur upon coupling of a clutch in succession to changeover of speed stage regardless of time-dependent deterioration or abrasion of the clutch.

Another object of the present invention is to provide a gear-mesh type automatic transmission system capable of controlling the clutch coupling speed so as to mitigate shock which is likely to occur upon clutch coupling operation succeeding to changeover of speed stage of the gear-mesh type transmission in spite of dispersion among individual clutches.

In view of the above and other objects which will become apparent as the description proceeds, there is provided according to a general aspect of the present invention a gear-mesh type automatic transmission system which includes a gear-mesh type transmission for outputting an output power of an engine at a selected gear ratio, an electromagnetic clutch for effectuating transmission and interruption of the output power from an output shaft of the engine to an input shaft of the gear-mesh type transmission, a shift/select actuator for shifting a speed change gear to a shift/select position in the gear-mesh type transmission, a shift/select position sensor for detecting a shift/select position of the speed change gear in the gear-mesh type transmission, and a control unit for driving the shift/select actuator in accordance with a shift lever position selected by a driver while monitoring the shift/select position, to thereby change over automatically the gear-mesh type transmission to a desired speed stage, wherein the control unit is designed to couple the electromagnetic clutch while carrying out a feedback control on the basis of a rate of change of rotation speed of the engine in succession to the speed stage changeover of the gear-mesh type transmission.

In a preferred mode for carrying out the invention, a plurality of control subperiods may be provided for the control unit in conjunction with coupling of the electromagnetic clutch, wherein a target engine speed change rate may be set for each of the plural control subperiods, for thereby effectuating feedback control of a command current value for the electromagnetic clutch.

In another preferred mode for carrying out the invention, condition for termination may be set for each of the plural control subperiods, wherein the control unit may preferably be so designed that every time the condition for termination is satisfied, the feedback control is caused to transit to a succeeding one of the plural control subperiods in a sequential manner.

In yet another mode for carrying out the invention, the control unit should preferably be so designed as to cause a first control subperiod to make transition to a second control subperiod when a predetermined time has lapsed in the first control subperiod immediately in succession to changeover of the speed stage of the gear-mesh type transmission, while when difference between the engine rotation speed and an input shaft rotation speed of the gear-mesh type transmission in the second control subperiod becomes smaller than a predetermined value inclusive, transition is made from the second control subperiod to a third control subperiod.

In still another mode for carrying out the invention, the control unit should preferably be so designed as to determine arithmetically a command current value for the electromagnetic clutch through an open loop control in a last control subperiod succeeding to the plural control subperiods.

In a further mode for carrying out the invention, the control unit should preferably be so designed that when condition for terminating the last control subperiod is satisfied, processing for completing coupling operation of the electromagnetic clutch is executed.

In a yet further mode for carrying out the invention, the control unit should preferably be so designed that at a time point when an exciting current for the electromagnetic clutch has reached a target value, decision is made that the condition for terminating the last control subperiod is satisfied.

By virtue of the arrangements described above, there can be obtained a gear-mesh type automatic transmission system capable of controlling clutch coupling speed so as to mitigate shock which is otherwise likely to occur upon coupling of the clutch succeeding to changeover of speed stage regardless of time-dependent deterioration of an electromagnetic clutch and intrinsic performance dispersion among individual clutches.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
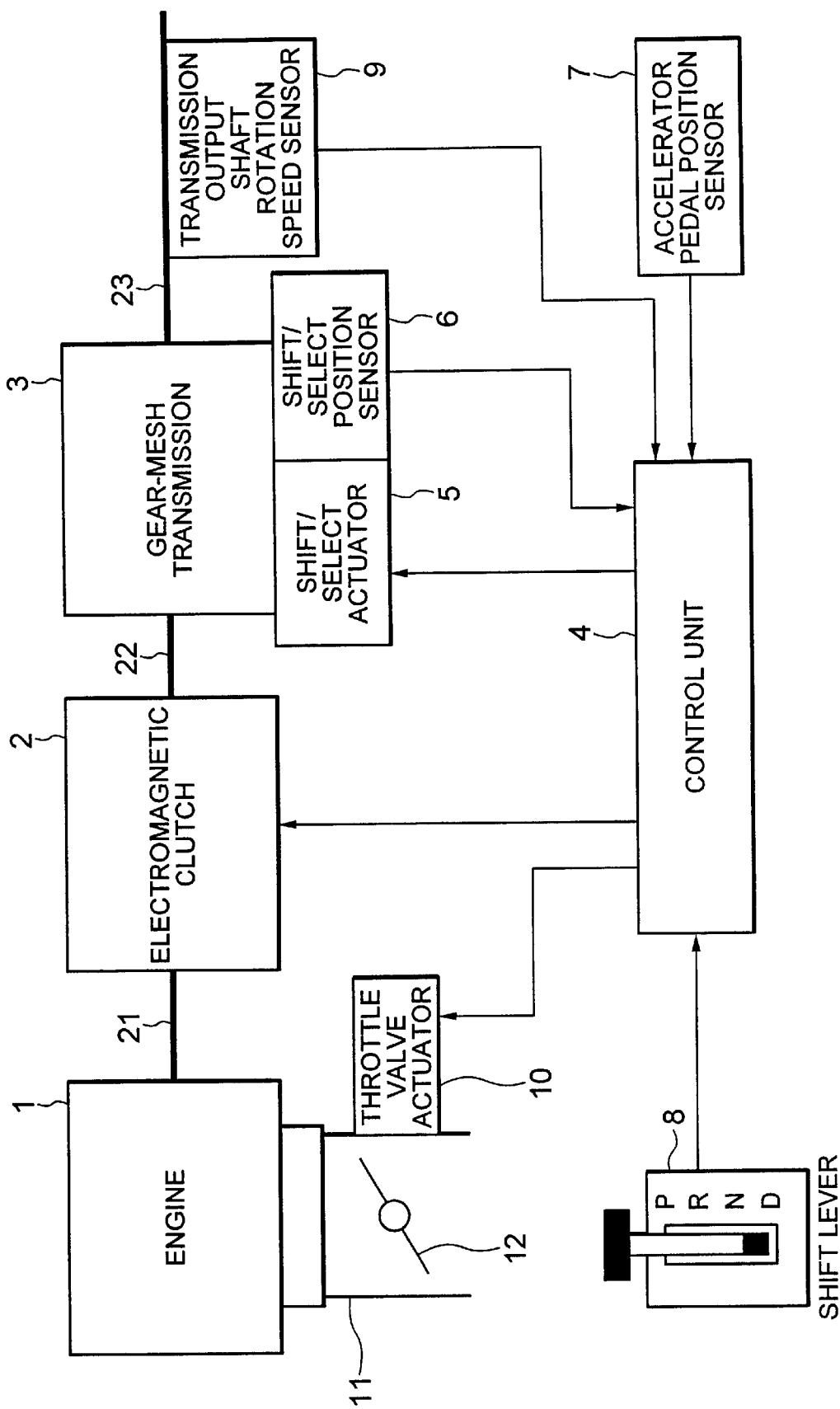
FIG. 1 is a block diagram showing generally and schematically a structure of a gear-mesh type automatic transmission system according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally and schematically a structure of the gear-mesh type automatic transmission system (which may also be termed as the gear-mesh type automatic speed change gear system) according to a first embodiment of the present invention. Referring to the figure, reference numeral 1 denotes an engine such as an internal combustion engine having an output shaft, i.e., a crank shaft 21, on which an electromagnetic clutch 2 is mounted. A gear-mesh type speed change gear or transmission 3 is installed on an output shaft 22 of the electromagnetic clutch 2. Parenthetically, the output shaft 22 of the electromagnetic clutch 2 constitutes an input shaft of the gear-mesh type transmission 3. Accordingly, the shaft 22 may also be referred to as the input shaft of the gear-mesh type transmission 3. The output torque of the gear-mesh type transmission 3 is operatively transmitted to tires (not shown) of a motor vehicle (not shown either) via an output shaft 23 of the transmission.

The engine 1, the electromagnetic clutch 2 and the gear-mesh type transmission 3 are controlled by a control unit 4 which may be constituted by a microcomputer or microprocessor.

The gear-mesh type transmission 3 is provided with a shift/select actuator 5 and a shift/select position sensor 6. The shift/select actuator 5 is designed to serve for gear change operation of the gear-mesh type transmission 3, while the shift/select position sensor 6 is employed for detecting a shift/select position of the gear-mesh type transmission 3.

The accelerator pedal (not shown) manipulated by an operator or a driver of the motor vehicle is provided with an accelerator pedal position sensor 7 for detecting a accelerator pedal depression stroke. Further provided is a shift lever 8 which is manipulated by the driver for outputting a signal indicative of the shift lever position.

A transmission output shaft rotation speed sensor 9 is provided in association with the output shaft of the gear-mesh type transmission 3 for detecting the rotation speed (rpm) of the output shaft 23 of the transmission 3.

Output signals of the shift/select position sensor 6, the accelerator pedal position sensor 7, the shift lever 8 and the transmission output shaft rotation speed sensor 9 are inputted to (or fetched by) the control unit 4.

Installed within an intake pipe 11 of the engine 1 is a throttle valve 12 the opening degree of which is controlled through a throttle valve actuator 10.

The control unit 4 is so designed or programmed to control the gear-mesh type transmission 3 by controlling the shift/select actuator 5 while controlling the output torque of the engine 1 by controlling the throttle valve actuator 10 on the basis of the input signals delivered from the various sensors mentioned previously.

More specifically, the control unit 4 may be so designed or programmed as to process the output signal of the accelerator pedal position sensor 7 which indicates proportionally the accelerator pedal depression stroke, to thereby determine arithmetically the desired or target throttle valve opening degree which conforms to the accelerator pedal depression stroke to thereby drive the throttle valve actuator 10 so that the throttle valve can assume a position corresponding to a desired or target opening degree. In other words, the throttle valve 12 is controlled through a feedback control loop including the control unit 4.

Supplied to the electromagnetic clutch 2 is a clutch exciting current of a magnitude which is proportional to the torque to be transmitted through the clutch (hereinafter also referred to as the clutch transmitting torque) under the control of the control unit 4 so that transmission/interruption (on/off) of the engine output torque from the crank shaft 21 to the input shaft 22 of the transmission 3 can controllably be realized.

Although it is presumed that the electromagnetic clutch 2 is employed in the case of the gear-mesh type automatic transmission system now under consideration, it goes without saying that a clutch of hydraulically driven type may equally be employed in place of the electromagnetic clutch 2.

The gear-mesh type transmission 3 may include, for example, five sets of forward speed-change gears which mutually differ in respect to the gear ratio and one set of rearward speed-change gears, although they are omitted from illustration in the figure. The gear-mesh type transmission 3 undergoes speed change operations of the shift/select actuator 5 which is dedicated for the speed gear change operation under the control of the control unit 4 so that the desired or target speed stage can be put into effect. In other words, the gear-mesh type transmission 3 undergoes a feedback control so that the desired or target speed stage can be effectuated or validated.

Further, the control unit 4 is so designed or programmed as to fetch the signal indicating the accelerator pedal depression stroke, the position signal (switch signal) indicating the position of the shift lever 8 and the signal indicating the rotation speed (rpm) of the output shaft 23 of the transmission from the output of the accelerator pedal position sensor 7, the shift lever position sensor and the transmission output shaft rotation speed sensor 9, respectively, to thereby determine the speed stage suited for the running state of the motor vehicle in accordance with a relevant transmission shift pattern (not shown).

Additionally, the control unit 4 is designed or programmed to output a control signal for the shift/select actuator 5 while checking the shift/select position on the basis of the detection signal outputted from the shift/select position sensor 6 so that the speed change operation of the gear-mesh type transmission 3 is performed for setting or validating the target speed stage.

Figure 2:
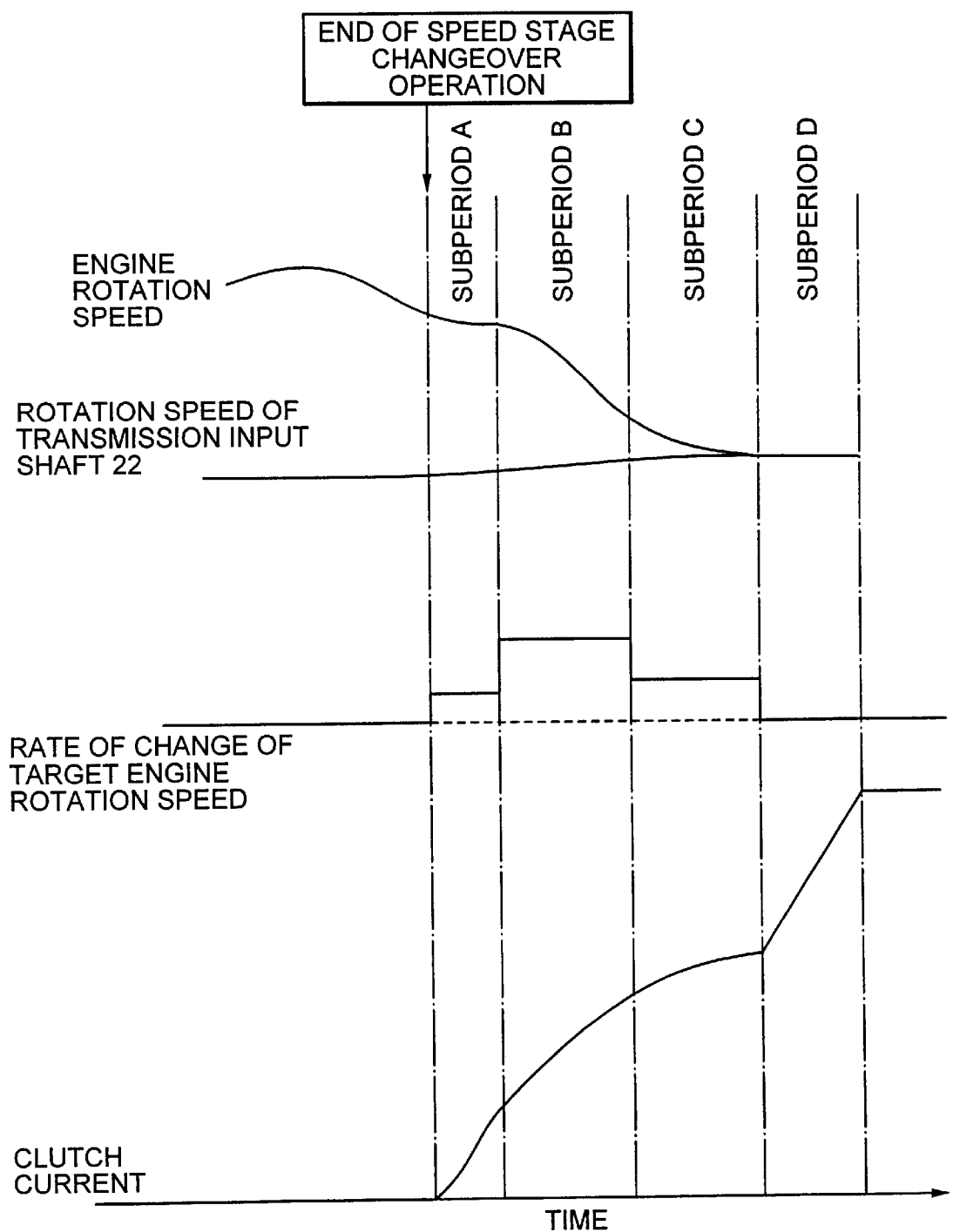
FIG. 2 is a timing chart for illustrating clutch coupling control operation in the gear-mesh type automatic transmission system according to the first embodiment of the invention shown in FIG. 1.

Now, referring to a timing chart shown in FIG. 2, description will turn to the clutch coupling control operation in the gear-mesh type automatic transmission system according to the first embodiment of the invention shown in FIG. 1. Incidentally, the timing chart of FIG. 2 illustrates changes of the rotation speed (rpm) of the engine 1 (or the crank shaft 21), rotation speed (rpm) of the input shaft 22 of the transmission 3, rate of change of the desired or target engine rotation speed (hereinafter also referred to as the target engine speed change rate) and the clutch current, respectively, as a function of time lapse.

More specifically, the timing chart shown in FIG. 2 is depicted in conjunction with the clutch control carried out after the speed stage changeover operation of the gear-mesh type transmission 3. For convenience of the discussion, the clutch control period is divided into four subperiods, i.e., subperiod A, subperiod B, subperiod C and subperiod D, wherein status transition is made from the subperiod A to the subperiod B, from the subperiod B to the subperiod C and from the subperiod C to the subperiod D in this order.

At first, in the subperiod A which starts from the time point at which the clutch coupling control operation begins, feedback control is so performed that the engine speed change rate remains at a low level. Thus, shock which would otherwise take place upon clutch coupling control operation can be mitigated.

Subsequently, in the subperiod B, the target engine speed change rate is set primarily in view of shortening the time taken for the speed change, because shock is difficult to occur even when the engine speed change rate is increased to a certain extent upon lapse of a certain time from the start of the clutch coupling control operation, whereon the feedback control is performed.

In succession, when the engine rotation speed approaches the rotation speed of the input shaft 22 of the gear-mesh type transmission 3, the target engine speed change rate is set at a low level for intercoupling or combining together the engine rotation speed and the rotation speed of the input shaft of the gear-mesh type transmission 3 because shock is difficult to occur whereon the feedback control described previously is performed. This control is carried out during the subperiod C.

Finally, in the subperiod D, after coincidence has been detected between the engine rotation speed and the rotation speed of the input shaft 22 of the transmission 3, the command value for the exciting current is increased at a constant rate through an open loop control toward a desired or target clutch excitation current value at which the engine output torque can sufficiently and satisfactorily be transmitted from the crank shaft 21 to the input shaft 22 of the transmission 3.

In that case, the target clutch current ITGT in ampere or [A] for the feedback control can arithmetically be determined in accordance with the undermentioned expression (1):

$$ITGT = (Ii)n + KP \{(dNi/dt)o - (dNe/dt)n\} + KD \{(dNe/dt)(n-1) - (dNe/dt)n\} \quad (1)$$

where
(Ii)n in [A] represents an integral term of the target clutch current in the instant arithmetic operation,
KP in [A/(r/min/10 ms)] represents a proportional gain,
(dNi/dt)o in [r/min/10 ms] represents the target engine speed change rate,
(dNe/dt)n in [r/min/10 ms] represents the engine speed change rate in the instant arithmetic operation,
KD in [A/(r/min/10 ms)] represents a differential gain, and (dNe/dt)(n-1) in [r/min/10 ms] represents the target engine speed change rate in the preceding arithmetic operation.

In this conjunction, the target clutch current (Ii)n in [A] in the instant or current arithmetic operation can be determined in accordance with the following expression (2):

$$(Ii)n = (Ii)(n-1) + KI \{(dNi/dt)o - (dNe/dt)n\} \quad (2)$$

where (Ii)(n-1) in [A] represents the integral term of the target clutch current in the preceding arithmetic operation, and KI in [A/(r/min/10 ms)] represents an integral gain.

Figure 3:
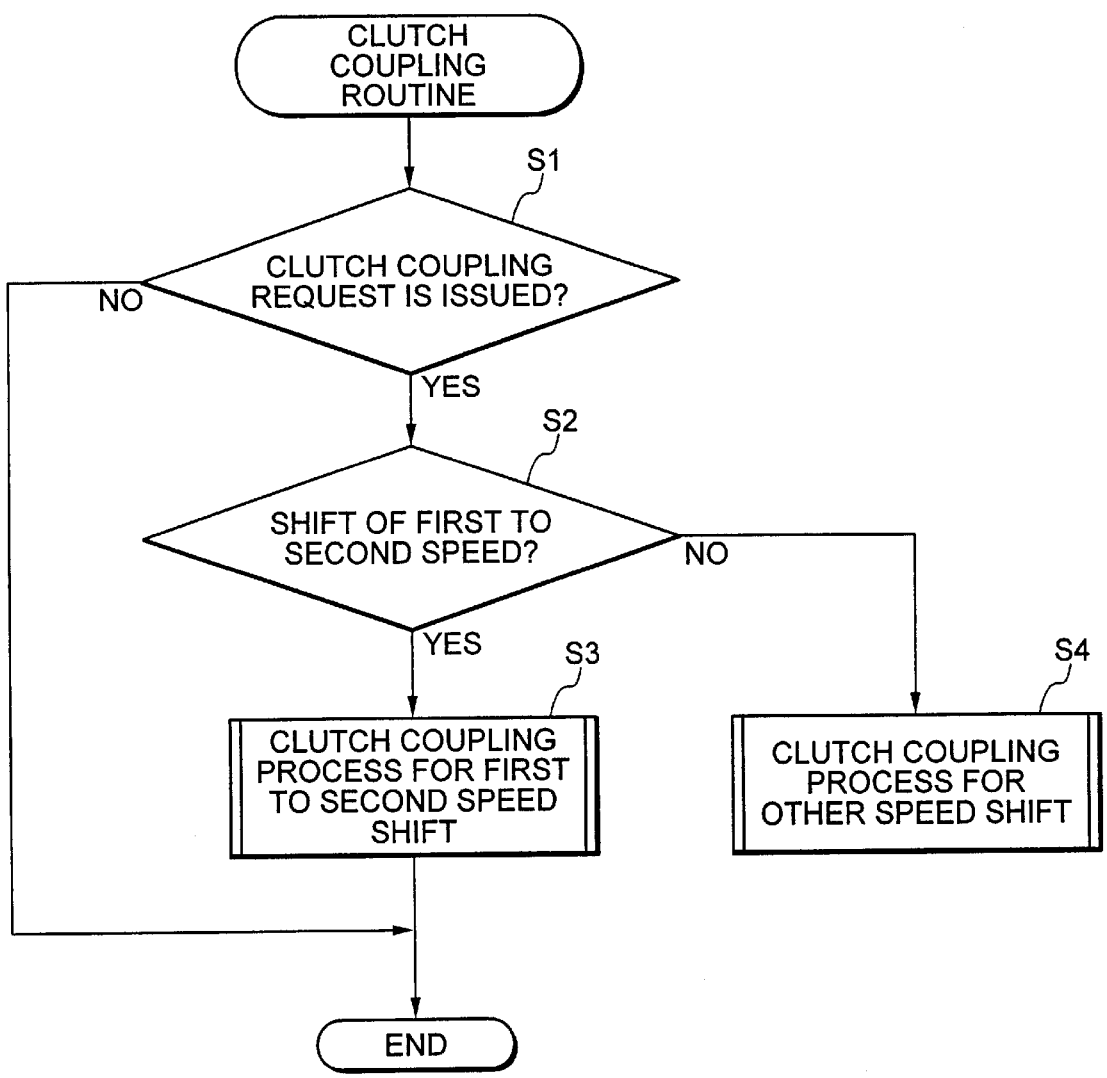
FIG. 3 is a flow chart for illustrating a decision processing for clutch coupling control in the gear-mesh type automatic transmission system according to the first embodiment of the invention.

Next, by reference to FIG. 3, description will turn to a basic decision processing procedure for the clutch coupling control operation in the gear-mesh type automatic transmission system according to the first embodiment of the invention. FIG. 3 is a flow chart for illustrating the decision processing for the clutch coupling control operation in the gear-mesh type automatic transmission system according to the first embodiment of the invention. The processing procedure or routine shown in FIG. 3 may be executed periodically at a predetermined time interval, e.g. every 10 ms.

Referring to FIG. 3, decision is made in a step S1 as to whether or not a clutch coupling request has been issued after the speed stage changeover or shift operation of the gear-mesh type transmission 3. When it is decided that the clutch coupling request has not been issued (i.e., when the decision step S1 results in negation "No"), the processing routine shown in FIG. 3 is terminated intactly.

On the other hand, when decision is made in the step S1 to the effect that the clutch coupling request is issued (i.e., when the decision step S1 results in affirmation "yes"), then the processing routine proceeds to a step S2 where it is decided whether or not the clutch coupling request now concerned is issued in conjunction with the speed stage changeover or shift from the first to the second speed stage.

When it is decided in the step S2 that the clutch coupling request is issued in conjunction with the speed changeover or shift operation from the first to the second speed stage (i.e., when the decision step S2 results in affirmation "Yes"), processing for the clutch coupling operation is executed in conjunction with the speed shift operation from the first to the second speed stage in a step S3, whereupon the processing routine shown in FIG. 3 comes to an end.

On the contrary, when the decision step S2 results in negation "No" indicating that the clutch coupling operation is not for the speed shift from the first to the second speed stage, then the clutch coupling processing for other speed shift operation is executed in a step S4. Needless to say, processing steps similar to those shown in FIG. 3 are executed for the clutch coupling operation relevant to the other speed change request.

Next, referring to FIG. 4, description will be made in concrete concerning the processing for the clutch coupling operation (FIG. 3, step S3) performed in succession to the speed shift or changeover, for example, from the first to the second speed stage in the gear-mesh type automatic transmission system according to the first embodiment of the invention. By the way, FIG. 4 is a flow chart for illustrating a clutch coupling control operation succeeding to the speed changeover from the first to the second speed stage in the gear-mesh type automatic transmission system according to the instant embodiment of the invention.

Figure 4:
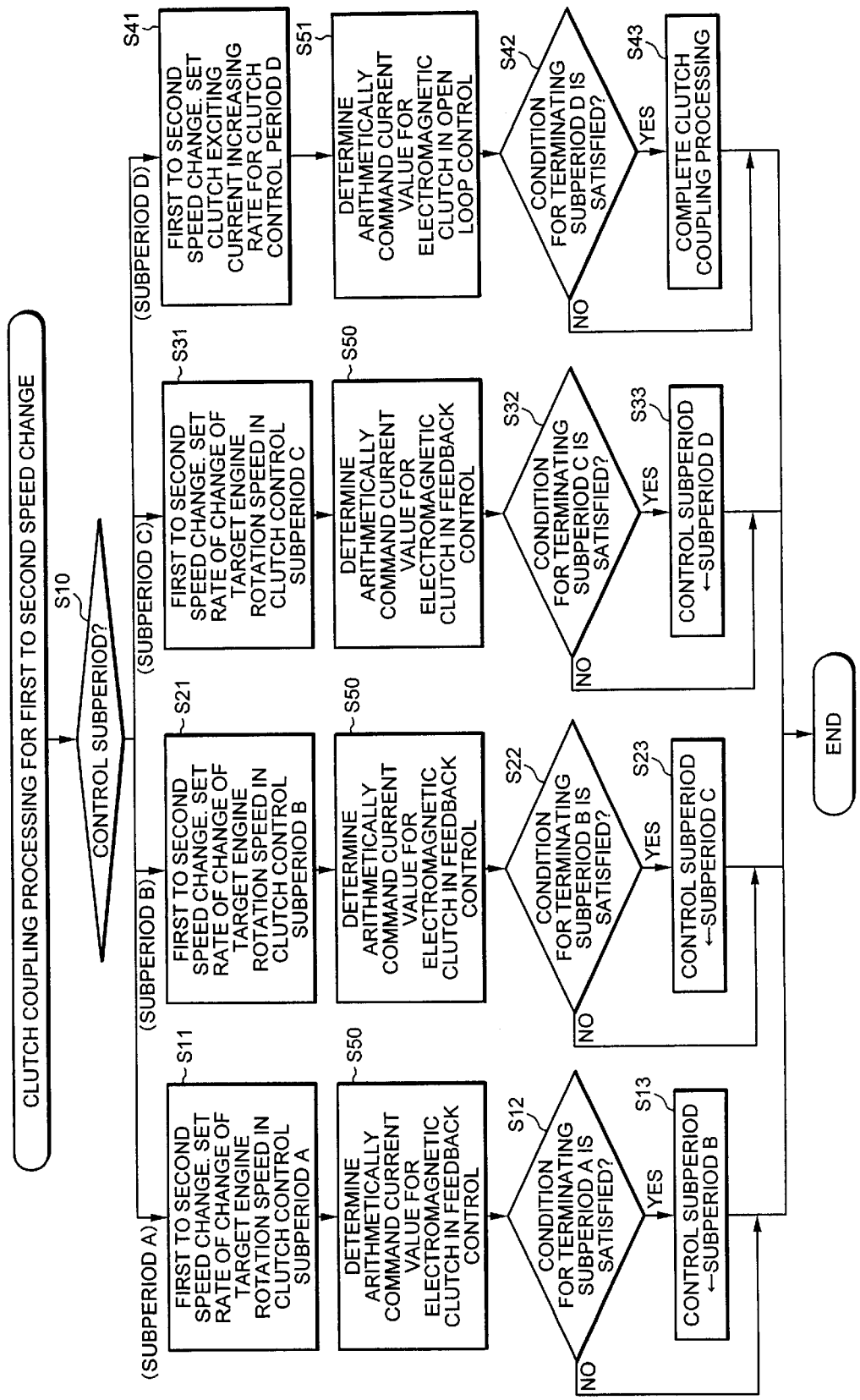
FIG. 4 is a flow chart for illustrating a clutch coupling control operation upon speed stage changeover from a first to a second speed stage in the gear-mesh type automatic transmission system according to the first embodiment of the invention.

Referring to FIG. 4, decision is first made in a step S10 whether the control subperiod for the clutch coupling control for the speed shift from the first to the second speed stage falls in any one of the control subperiods A to D (see FIG. 2). When it is decided that the control subperiod is one of the subperiod A to subperiod C, then the target engine speed change rate is set for the relevant control subperiod (step S11, 21 or 31).

Further, when it is decided in the step S10 that the control subperiod falls within the subperiod D, an increasing rate of the clutch current command value is set in a step S41.

Next, in succession to execution of the step S11, S21 or the step S31 in the subperiod A, the subperiod B or the subperiod C, the relevant current command value for exciting the electromagnetic clutch 2 is arithmetically determined in accordance with the expressions (1) and (2) for performing the feedback control described previously (step S50).

On the other hand, after execution of the step S41 for the subperiod D, the exciting current command value of the electromagnetic clutch 2 for the open loop control is arithmetically determined without executing the feedback control described hereinbefore (step S51).

Subsequently, in succession to each step S50 or S51 described above, decision is made in a step S12, S22, S32 or S42 whether or not the condition of termination for the subperiod A, B, C or D is satisfied.

More specifically, in the step S12, decision is made as to the condition of termination for the subperiod A (e.g. lapse of 200 ms). When the decision results in that the subperiod-A terminating condition is satisfied (i.e., when the decision step S12 results in affirmation "Yes"), then the control subperiod is updated to the subperiod B (step S13), whereupon the processing routine shown in FIG. 4 comes to an end.

Further, in the step S22, decision is made as to the condition of termination for the subperiod B (e.g. as to whether or not difference in rpm between the engine rotation speed and the input shaft rotation speed of the transmission 3 is less than 300 rpm inclusive). When the decision results in that the subperiod-B terminating condition is satisfied (i.e., when the decision step S22 results in affirmation "Yes"), then the control subperiod is updated to the subperiod C (step S23), whereupon the processing routine shown in FIG. 4 comes to an end.

Further, in the step S32, decision is made as to the condition of termination of the subperiod C (e.g. as to whether difference in rpm between the engine rotation speed and the input shaft rotation speed of the transmission 3 is less than 10 rpm inclusive). When the decision results in that the subperiod-C terminating condition is satisfied (i.e., when the decision step S32 results in affirmation "Yes"), then the control subperiod is updated to the subperiod D (step S33), whereupon the processing routine shown in FIG. 4 comes to an end.

Finally, in the step S42, decision is made as to the condition for termination of the subperiod D (e.g. as to whether the clutch exciting current has reached the target value). When the decision results in that the subperiod-D terminating condition is satisfied (i.e., when the decision step S42 results in affirmation "Yes"), then a processing for completing the clutch coupling control operation is executed (step S43), whereupon the processing routine shown in FIG. 4 comes to an end.

On the other hand, when decision is made in each step S12, S22, S32 or S42 that the condition for termination of the relevant control subperiod is not satisfied (i.e., when the decision step S12, S22, S32 or S42 results in negation "No"), then the processing routine illustrated in FIG. 4 is immediately terminated.

As is apparent from the foregoing, by carrying out the coupling control of the electromagnetic clutch 2 after changeover of the speed stage of the gear-mesh type transmission 3 through feedback control of the rate of change of the rotation speed of the engine 1, occurrence of shock due to deterioration or abrasion of the electromagnetic clutch 2 upon changeover or shift of the speed stage can satisfactorily be suppressed or prevented.

Further, the coupling control of the electromagnetic clutch 2 can be executed without paying attention to dispersion or variance in the degree of coupling force among the individual electromagnetic clutches 2.

Many modifications and variations of the present invention are possible in the light of the above techniques. It is therefore to be understood that within the scope of the appended claims, the invention may be practiced otherwise than as specifically described.

What is claimed is:
1. A gear-mesh type automatic transmission system, comprising:
   a gear-mesh type transmission for outputting an output power of an engine at a selected gear ratio;
   clutch means for effectuating transmission and interruption of the output power from an output shaft of said engine to an input shaft of said gear-mesh type transmission;

shift/select actuator means for shifting a speed change gear to a shift/select position in said gear-mesh type transmission;

shift/select position sensor means for detecting a shift/select position of said speed change gear in said gear-mesh type transmission; and control means for driving said shift/select actuator means in accordance with a shift lever position selected by a driver while monitoring said shift/select position, to thereby change over automatically said gear-mesh type transmission to a desired speed stage, wherein said control means is designed to couple said clutch means while carrying out a feedback control on the basis of a rate of change of rotation speed of said engine in succession to the speed stage changeover of said gear-mesh type transmission.

2. A gear-mesh type automatic transmission system according to claim 1, wherein a plurality of control subperiods are provided for said control means in conjunction with coupling of said clutch means, and a target engine speed change rate is set for each of said plural control subperiods, for thereby effectuating feedback control of a command current value for said clutch means.

3. A gear-mesh type automatic transmission system according to claim 2, wherein condition for termination is set for each of said plural control subperiods, and wherein said control means is so designed that every time said condition for termination is satisfied, said feedback control is caused to transit to a succeeding one of said plural control subperiods in a sequential manner.

4. A gear-mesh type automatic transmission system according to claim 3, wherein said control means is so designed as to cause a first control subperiod to make transition to a second control subperiod when a predetermined time has lapsed in said first control subperiod immediately in succession to changeover of the speed stage of said gear-mesh type transmission, and wherein when difference between said engine rotation speed and an input shaft rotation speed of said transmission in said second control subperiod is not greater than a predetermined value, transition is made from said second control subperiod to a third control subperiod.

5. A gear-mesh type automatic transmission system according to claim 1, wherein said control means is so designed as to determine arithmetically a command current value for said clutch means through an open loop control in a last control subperiod succeeding to said plural control subperiods.

6. A gear-mesh type automatic transmission system according to claim 5, wherein said control means is so designed that when condition for terminating said last control subperiod is satisfied, processing for completing coupling operation of said clutch means is executed.

7. A gear-mesh type automatic transmission system according to claim 6, wherein said control means is so designed that at a time point when an exciting current for said clutch means has reached a target value, decision is made that the condition for terminating said last control subperiod is satisfied.

* * * * *